(12) United States Patent
Owen

(10) Patent No.: US 9,930,882 B2
(45) Date of Patent: Apr. 3, 2018

(54) TURKEY CARRIER AND ITS METHOD OF MANUFACTURE

(71) Applicant: Martin Dennis Owen, Callaway, VA (US)

(72) Inventor: Martin Dennis Owen, Callaway, VA (US)

( * ) Notice: Subject to any disclaimer, the term of this patent is extended or adjusted under 35 U.S.C. 154(b) by 83 days.

(21) Appl. No.: 14/832,432

(22) Filed: Aug. 21, 2015

(65) Prior Publication Data

US 2016/0050905 A1 Feb. 25, 2016

Related U.S. Application Data

(60) Provisional application No. 62/040,057, filed on Aug. 21, 2014.

(51) Int. Cl.
*A01K 65/00* (2006.01)
*A01M 31/00* (2006.01)

(52) U.S. Cl.
CPC .................... *A01M 31/006* (2013.01)

(58) Field of Classification Search
CPC ............................. A01M 31/006; A01M 31/00
USPC ......................................................... 224/103
See application file for complete search history.

(56) References Cited

U.S. PATENT DOCUMENTS

| | | | |
|---|---|---|---|
| 2,904,236 A * | 9/1959 | Peterson ............. | A01M 31/006 224/921 |
| 3,096,010 A | 7/1963 | Rasmussen | |
| D278,456 S | 4/1985 | Lewis | |
| 4,728,123 A * | 3/1988 | Kassal .................. | A63C 11/02 224/220 |
| 4,962,929 A * | 10/1990 | Melton, Jr. ............ | A63B 69/38 119/770 |
| 5,077,927 A | 1/1992 | Derryberry | |
| 5,425,485 A | 6/1995 | Carlo | |
| 5,746,685 A * | 5/1998 | Glaser ................ | A63B 21/4021 2/161.1 |
| 5,806,732 A | 9/1998 | Hensley | |
| 5,908,206 A * | 6/1999 | LoPresti, Jr. ............. | A45F 3/14 2/160 |
| 6,168,556 B1 * | 1/2001 | Saavedra ........... | A63B 21/4021 224/220 |
| 6,443,338 B1 * | 9/2002 | Giacona, III .......... | A45C 13/30 224/148.6 |
| 6,923,356 B2 | 8/2005 | Reynolds | |

(Continued)

*Primary Examiner* — Derek Battisti
(74) *Attorney, Agent, or Firm* — New River Valley IP Law, P.C.; Michele L. Mayberry; Timothy D. Nolan

(57) ABSTRACT

A turkey carrier and method of manufacture of a turkey carrier are described. The turkey carrier may be assembled from a single strip of material, a buckle, and a strip of comfortable padding. The assembled turkey carrier comprises two loops (a small loop and a large padded adjustable loop) and an intermediate area. During use, the intermediate area between the small loop and the large loop of the carrier is positioned under the turkey's legs, typically above the spurs of a male turkey, so that the two loops are on opposite sides of the turkey's legs and the larger loop is inserted through the smaller loop and pulled tight to secure the legs leaving the larger padded loop to be used as a wrist strap. The carrier is designed to tightly secure the turkey's legs while simultaneously providing the user with a comfortable method of transporting the turkey.

6 Claims, 10 Drawing Sheets

(56) References Cited

U.S. PATENT DOCUMENTS

| | | |
|---|---|---|
| 7,320,318 B1 * | 1/2008 | Tentler ................. F41B 5/1469 |
| | | 124/35.2 |
| D631,924 S * | 2/2011 | Baldwin ...................... D21/662 |
| D707,918 S | 7/2014 | Salcido et al. |
| 9,277,744 B1 | 3/2016 | Sanders |
| 9,420,872 B2 | 8/2016 | Bird |
| D767,250 S | 9/2016 | Poggi |
| 2002/0108978 A1 | 8/2002 | Koxlien |
| 2003/0213828 A1 | 11/2003 | McKenzie |
| 2008/0217371 A1 | 9/2008 | Wemmer |
| 2009/0227381 A1 * | 9/2009 | Snavely, II ............. A63F 13/98 |
| | | 463/47 |
| 2012/0043357 A1 | 2/2012 | Campbell |

* cited by examiner

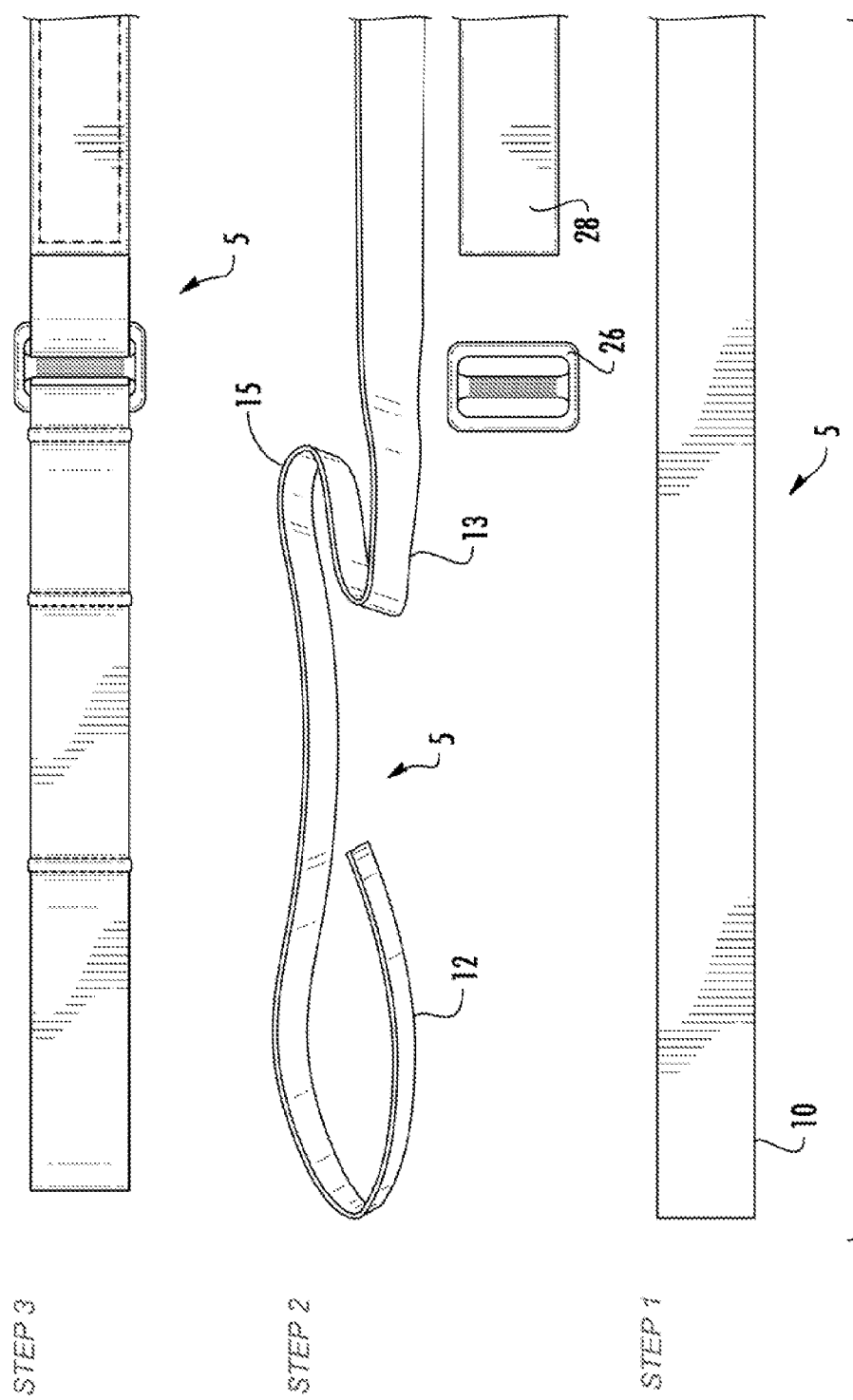

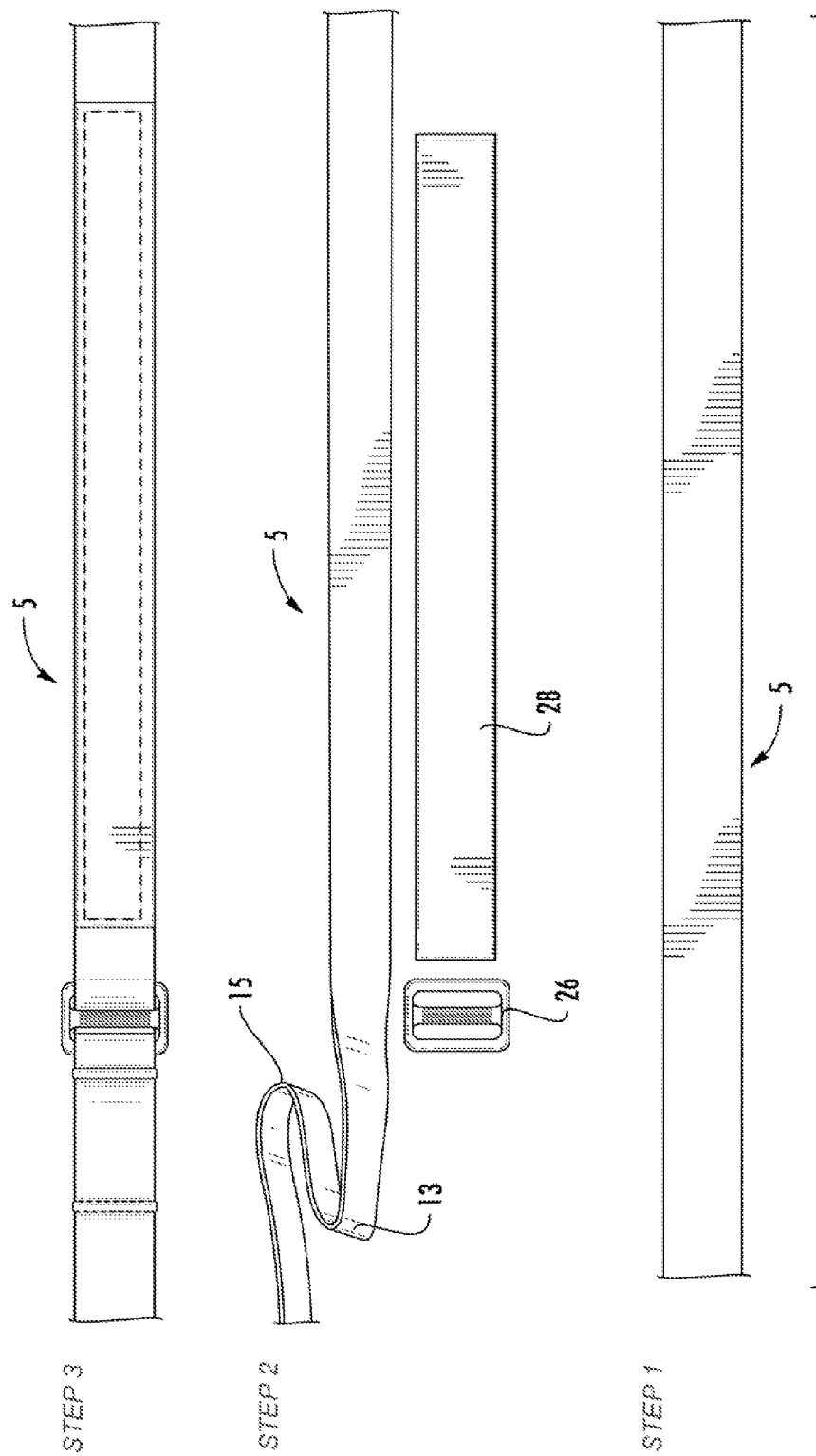

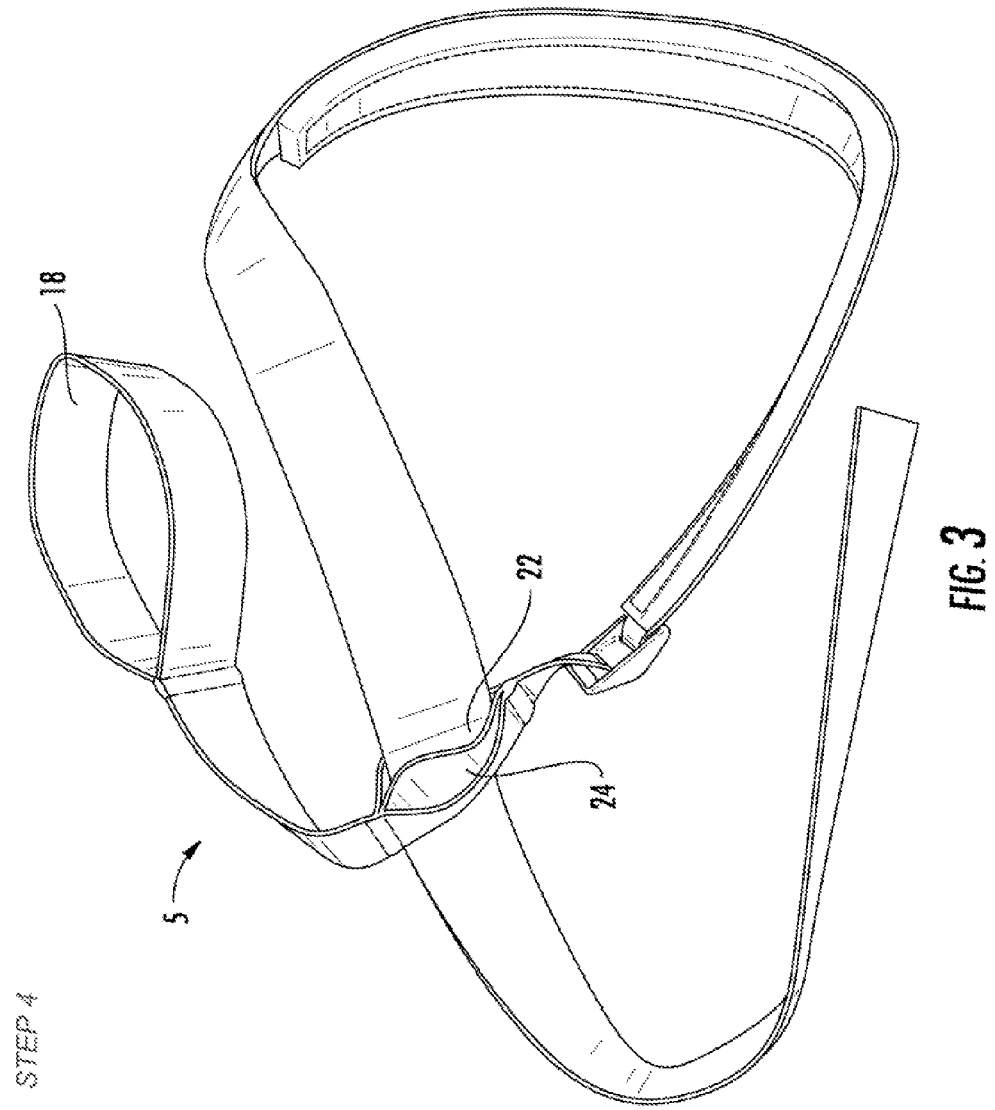

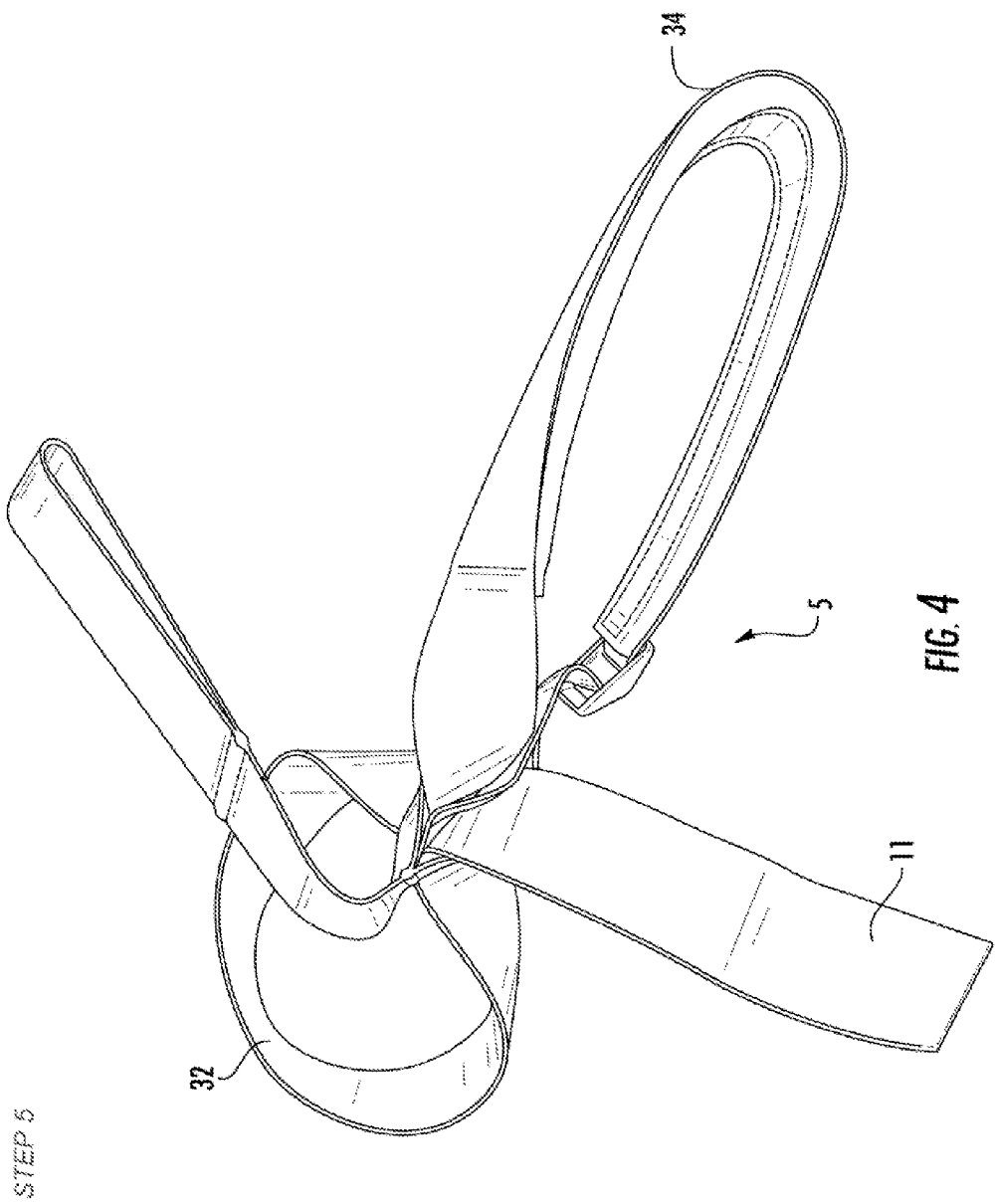

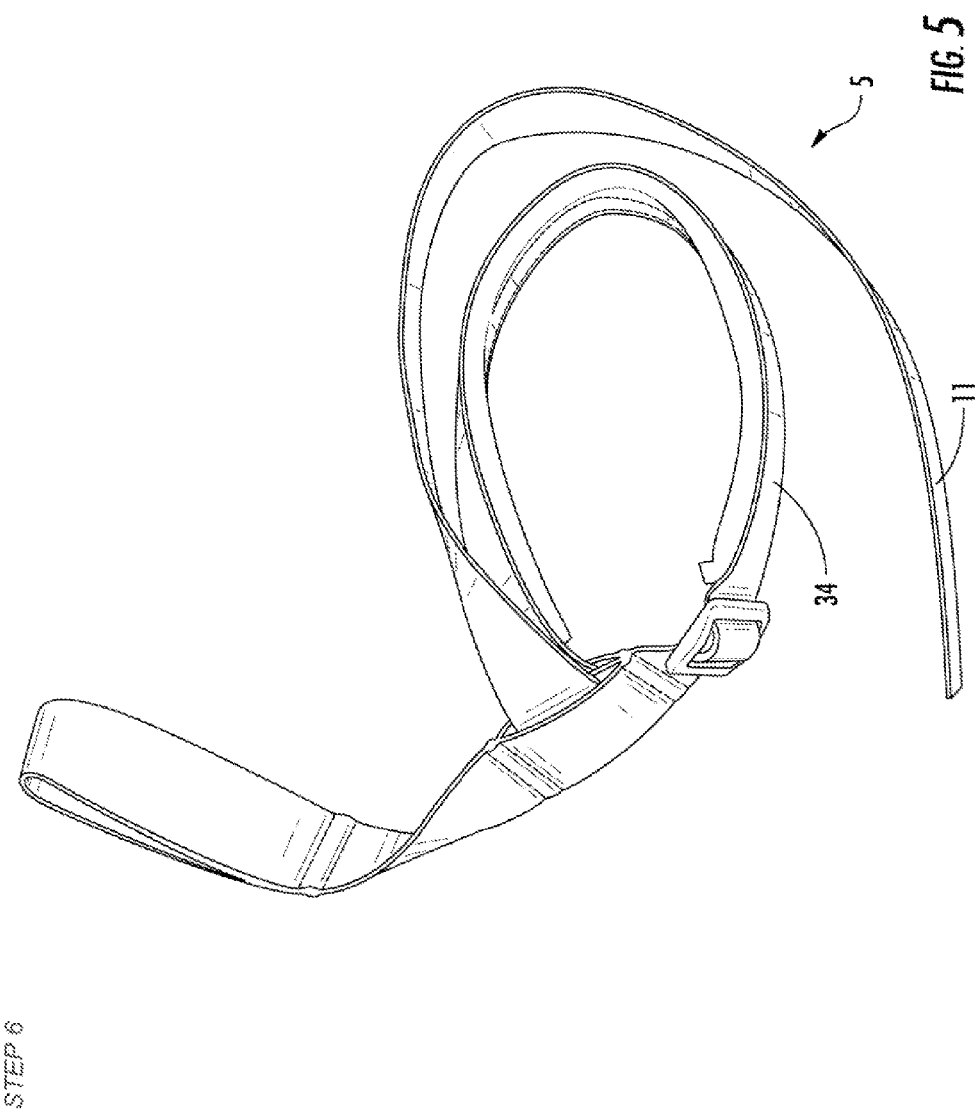

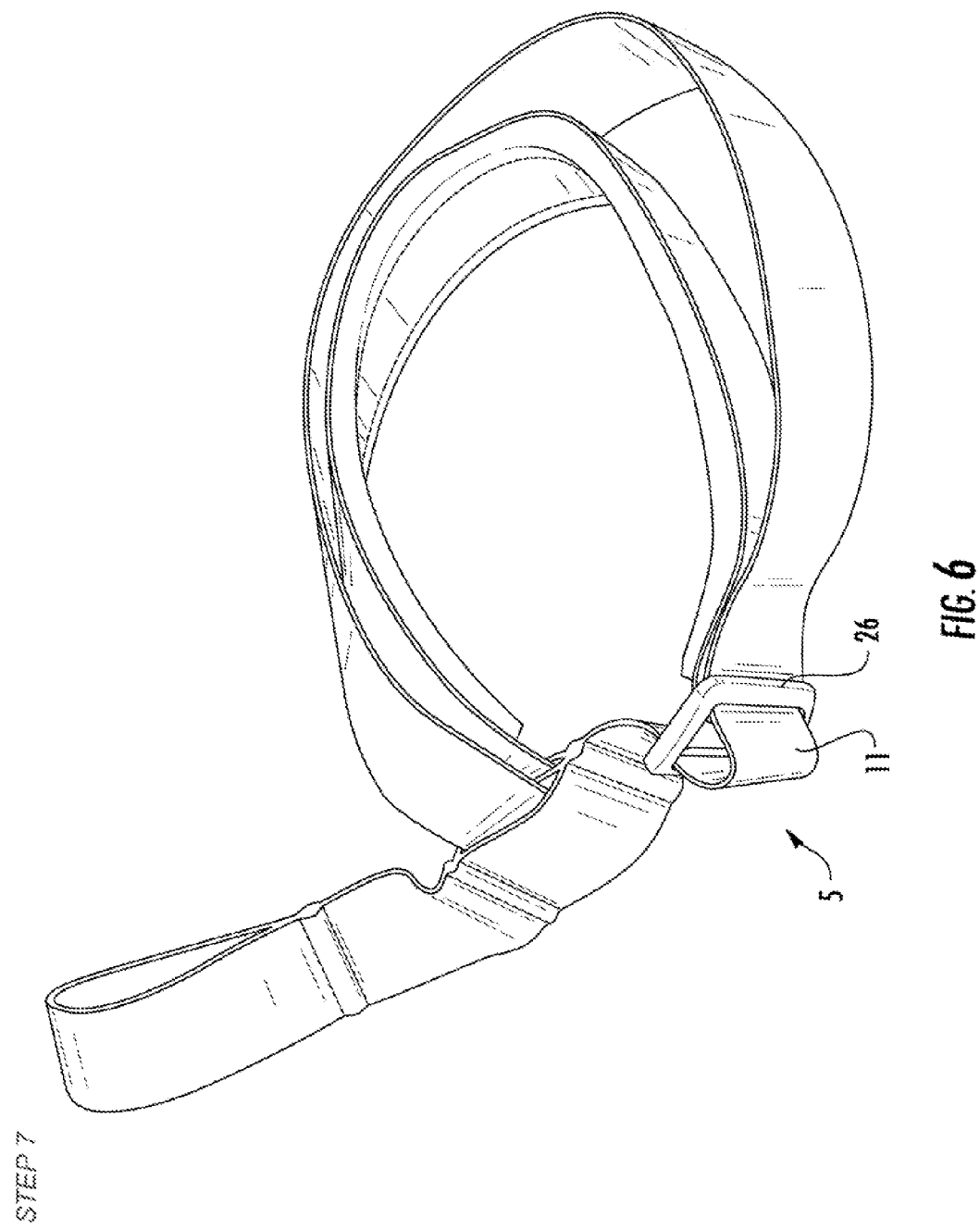

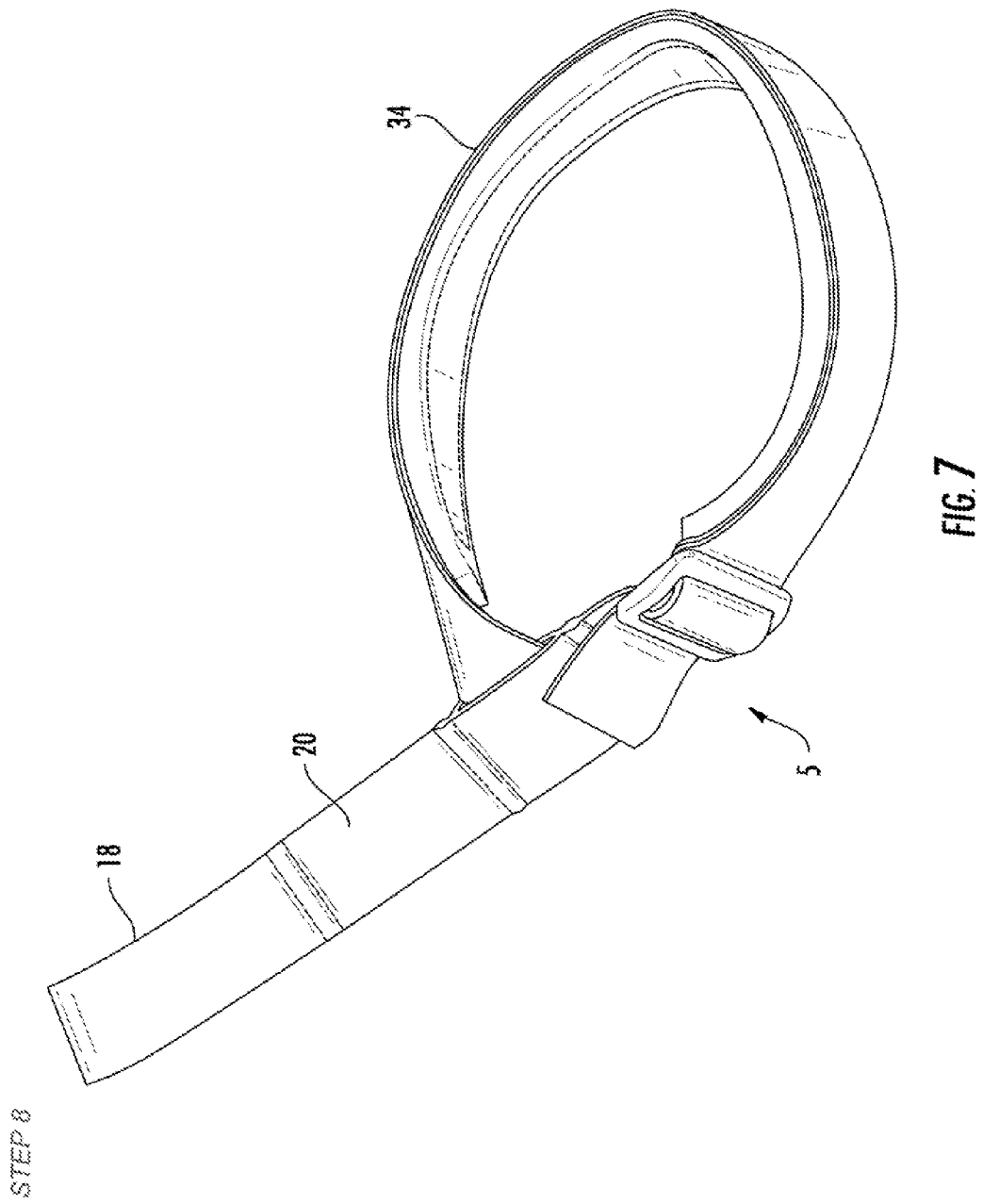

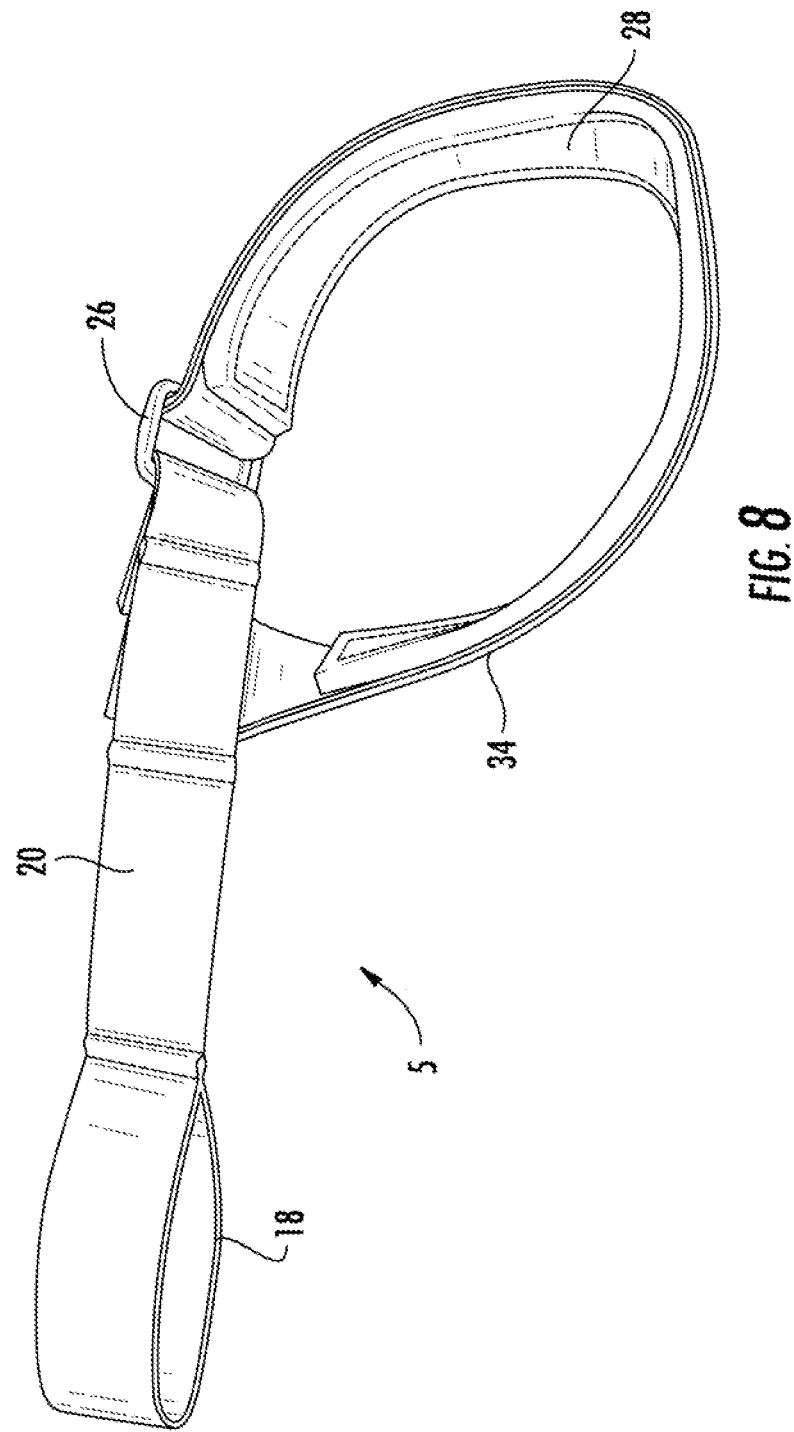

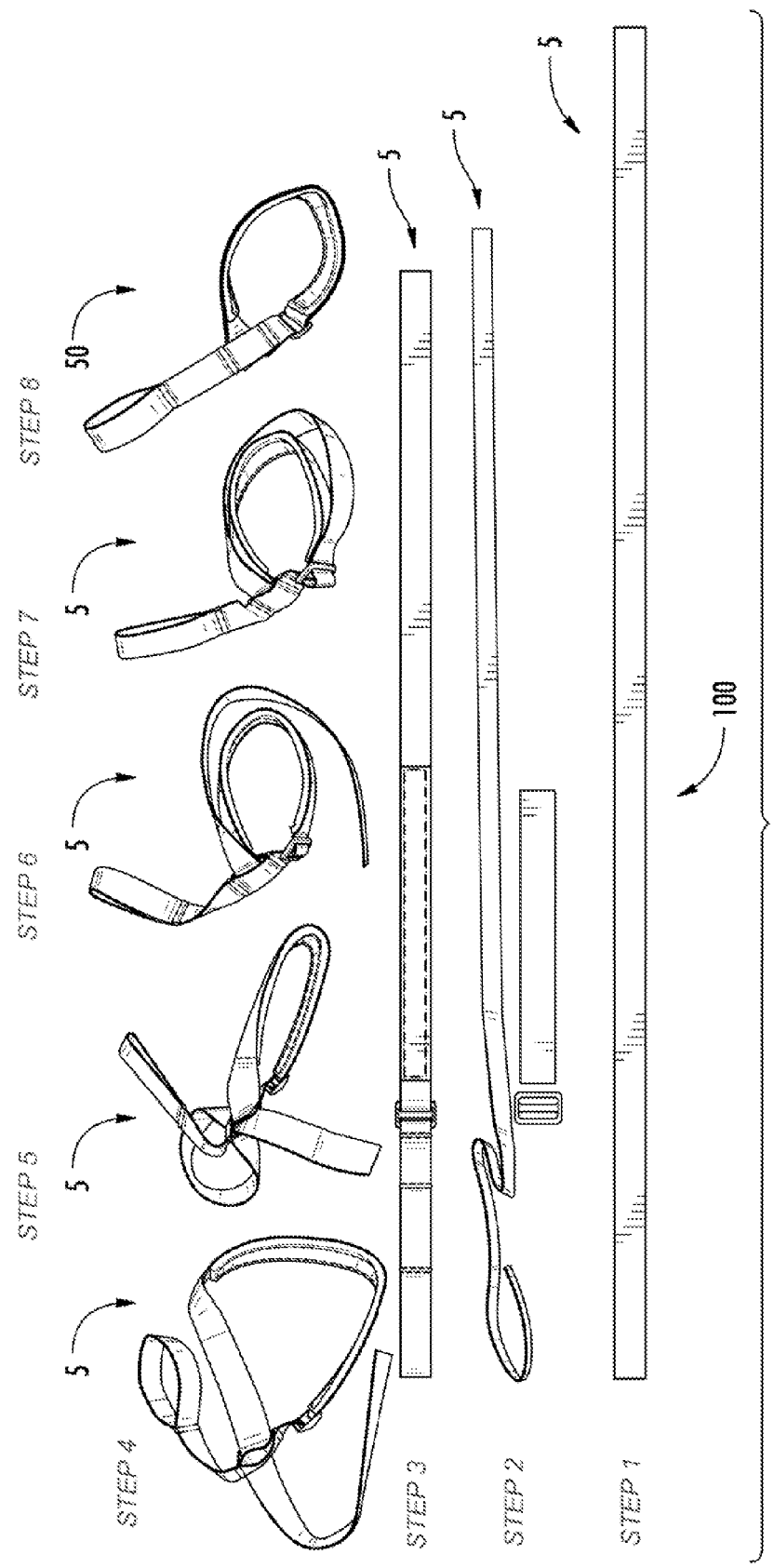

TURKEY CARRIER AND ITS METHOD OF MANUFACTURE

CROSS-REFERENCE TO RELATED APPLICATIONS

The present application relies on the disclosure of and claims priority to and the benefit of the filing date of U.S. Provisional Application No. 62/040,057, filed on Aug. 21, 2014, the disclosure of which is hereby incorporated by reference herein in its entirety.

BACKGROUND OF THE INVENTION

Field of the Invention

The present disclosure relates to turkey carriers. More particularly, the present disclosure relates to a turkey carrier that provides a wrist strap configured for over-the-shoulder transport of a turkey without requiring gripping of the turkey's legs.

Description of Related Art

As any wild turkey hunter knows, carrying a large turkey on a long distance trip through wilderness back to the vehicle can be an arduous task. Since many turkey carcasses are preserved as trophies, it's important not to drag the turkey on the ground or let it continuously bump against one's legs or hunting equipment. The most popular method is to grab the turkey by the legs and sling it over one's shoulder. However, having to grip the gobbler's legs for extended periods can cause stiff hands and forearm fatigue, and there is a risk of getting fingers stuck by spurs. While a number of wild turkey carriers have been attempted including those described in U.S. Patent Application Publication Nos. 20020108978 and 20120043357 there is still a need in the art for an effective solution to this problem.

SUMMARY OF THE INVENTION

Embodiments of the present disclosure provide a turkey carrier and a method of manufacture of a turkey carrier. The turkey carrier may be assembled from a single strip of material, a buckle, and a strip of comfortable padding. The assembled turkey carrier comprises two loops (a small loop and a large padded adjustable loop) and an intermediate area. During use, the intermediate area between the small loop and the large loop of the carrier is positioned under the turkey's legs, typically above the spurs of a male turkey, so that the two loops are on opposite sides of the turkey's legs and the larger loop is inserted through the smaller loop and pulled tight to secure the legs leaving the larger padded loop to be used as a wrist strap. Thus, the carrier is designed to tightly secure the turkey's legs while simultaneously providing the user with a comfortable method of transporting the turkey. The turkey carrier may be manufactured in several sizes such as small, medium, large, or extra-large to accommodate hunters of different sizes and arm lengths. The turkey carrier of this disclosure can be used with the right or left hand, is light-weight, simple and easy to use, and virtually eliminates grip fatigue. The turkey carrier is designed to place the spurs of a male turkey above the carrier's hand and eliminate the need for any gripping power since the bird's weight is supported by the weight of the arm in a natural "over the shoulder" carrying position.

Embodiments of the present disclosure provide a method of manufacture of a turkey carrier, comprising the steps of providing a strip of material, creating three arcuate bends in the strip of material, wherein the first bend is formed by the proximal end folded back onto the strip of material, and the second and third bends are formed from an S-shape or reverse S-shape fold, and stitching the material together at the first bend to form a first minor loop and at the second and third bends to form a pair of minor loops comprising a second and third minor loop in parallel to each other.

In embodiments, a buckle may be attached to the strip of material distal to the second and third minor loop and a strip of padding may be attached distal to the buckle. The strip of padding may be the same width and a portion of a length of the strip of material overlays the strip of material. Also, the distal end of the strip of material may be threaded through first the second minor loop and then the third minor loop or first the third minor loop and then the second minor loop such that the strip of material forms a figure eight comprising two major loops, and the distal end of the strip of material may be pulled taut to remove the first major loop such that only the second major loop remains such that the second major loop is positioned opposite the first minor loop with an intervening area of the strap in between them. Finally, the distal end of the strip of material may be threaded through the buckle to complete assembly of the turkey carrier.

Embodiments of the present disclosure also provide a turkey carrier, comprising a single strip of material configured to provide a first smaller loop, a second larger loop; and an intermediate area between the first loop and second loop. Additionally, the turkey carrier may further comprise a buckle attached to the strip of material at the second loop, wherein the buckle provides for adjustment of the diameter of the second loop as well as a strip of padding attached to the strip of fabric at the second loop, wherein the strip of padding is the same width as a portion of a length of the strip of material and overlays the strip of material. Further, in the turkey carrier of the present disclosure the second loop may be twisted orthogonally relative to the first loop. The first loop may comprise a set of stiches within the single strip of material and an end of the second loop may pass through the single piece of material at two parallel loops with a pair of sets of stiches as boundaries. During use, the intermediate area of the carrier is positioned under the turkey's legs (usually above the spurs of a male turkey) with the two loops on opposite sides, and the larger loop is inserted in the smaller loop and pulled tight to secure the legs while leaving the larger, adjustable padded loop to be used as a wrist strap.

BRIEF DESCRIPTION OF THE DRAWINGS

The accompanying drawings illustrate certain aspects of embodiments of the present invention, and should not be used to limit the invention. Together with the written description the drawings serve to explain certain principles of the invention.

FIG. 1 is a diagram showing steps 1-3 of a method of manufacture according to an embodiment of this disclosure.

FIG. 2 is a diagram showing an additional view of steps 1-3 of a method of manufacture according to an embodiment of this disclosure.

FIG. 3 is a diagram showing step 4 of a method of manufacture according to an embodiment of this disclosure.

FIG. 4 is a diagram showing step 5 of a method of manufacture according to an embodiment of this disclosure.

FIG. 5 is a diagram showing step 6 of a method of manufacture according to an embodiment of this disclosure.

FIG. 6 is a diagram showing step 7 of a method of manufacture according to an embodiment of this disclosure.

FIG. 7 is a diagram showing step 8 of a method of manufacture according to an embodiment of this disclosure, which shows a turkey carrier embodiment of this disclosure in assembled form.

FIG. 8 is a diagram showing step 8 of a method of manufacture according to an embodiment of this disclosure, which shows the opposite side of the turkey carrier embodiment shown in FIG. 7.

FIG. 9 is a diagram showing steps 1-8 of a method of manufacture according to an embodiment of this disclosure.

DETAILED DESCRIPTION OF VARIOUS EMBODIMENTS OF THE INVENTION

Figure 10C:
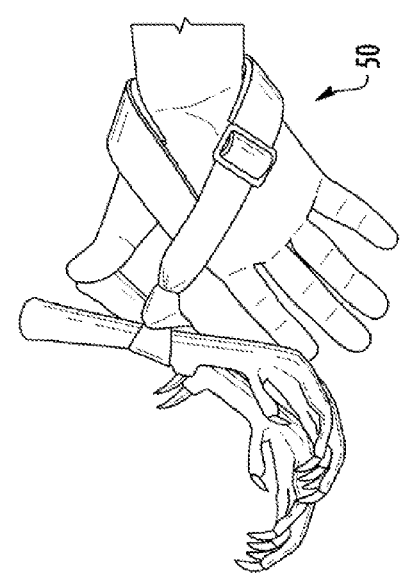
FIGS. 10A-10D are diagrams showing an embodiment of a series of steps on how to use a turkey carrier of the present disclosure.

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

Turning now to the figures, FIGS. 1 and 2 show steps 1-3 of a method of manufacture of a turkey strap according to an embodiment of this disclosure, while a completed turkey strap is shown in FIG. 3. Step 1 starts with an elongated piece of material 5. The strip of material 5 may be about 30 to 60 inches in length, such as about 35 to 55 inches, or about 40 to 50 inches in length or any length in between, depending on the desired size. The width may be substantially narrow in comparison to the length, and is preferably about 1 inch wide. As used herein, the term "about" or "approximately" preceding a value may include a range of values up to +/−10% of that value. For purposes of orientation, the proximal end 10 of the strip 5 is represented on the left side of FIG. 1 and the distal end is the opposite end (not shown). The material may be a natural fabric such as cotton or hemp or a synthetic material such as polypropylene, polyester, or nylon, or a blend of any combination of natural and/or synthetic fabrics. The material may be provided in a variety of colors, including maroon, pink, olive green, hunter orange, black, dark brown, and tan. In step 2, three folds in the strip of material are made. In the first fold, the proximal end is folded back on itself to create an arcuate bend 12 which forms a loop approximately 2 to 4 inches in length. The second and third folds are made to form an S-shaped or reversed S-shape of two arcuate bends 13, 15 facing in opposite directions such that the trailing end of the loop is approximately 2 to 4 inches from the proximal arcuate bend 12. Pins may be used to secure the folds in place. In step 3, the folds are stitched together such that for the first fold, the end of the strip is stitched at the point where it is folded back on itself to create a first minor loop 18 and in the second and third folds, the material is stitched to join the bends to the strip of material such that two parallel loops 22, 24 created by three parallel strips of fabric of the reverse S-shape are created. The two parallel loops may be at least 1 inch in length to accommodate the width of the strip of material. Finally in step 3, the material is threaded through a buckle 26 such that the buckle is attached at the distal end of the two parallel loops. A strip of thicker material such as neoprene padding 28, approximately 8 to 12 inches in length and the same width as the strip of material is then sewn to overlay the material distal from the buckle 26. The padding 28 may be around 2-6 millimeters deep, or any depth in between including 3, 4, or 5 millimeters.

FIG. 3 shows the distal end of the strip of material 5 is threaded through one of the two parallel loops 22 in step 4. FIG. 4 shows that the distal end 11 of the strip of material 5 is then threaded through the other parallel loop 24 in step 5 such that the strip of material makes a FIG. 8 shape where the two loops 32, 34 of the FIG. 8 intersect at the two parallel loops. One of the loops 34 comprises the strip of thicker material. FIG. 5 shows that one of the loops is pulled tight in step 6 such that a single loop 34 comprising the neoprene padding remains, with the distal end 11 of the strip of material 5 wrapped around the loop. FIG. 6 shows that the distal end 11 of the strip of material 5 is threaded through the buckle 26 in step 7. As described in greater detail below with reference to components numbers, FIG. 7 shows that the distal end is then pulled through in step 8 to complete assembly. FIG. 8 shows a view of the completed assembly on the opposite side of the turkey strap that is shown in FIG. 7. FIG. 9 shows steps 1-8 of the method 100 of manufacture of this disclosure.

Figure 10F:
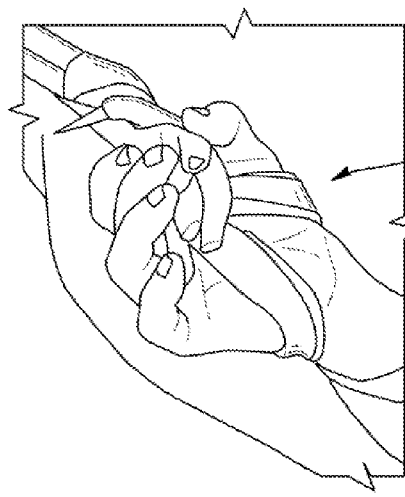
FIGS. 10E and 10F are diagrams showing an embodiment of a series of steps on how to use a turkey carrier of the present disclosure to carry a turkey over the shoulder.
Figure 10B:
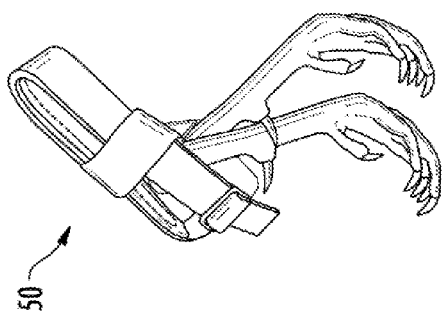
Figure 10E:
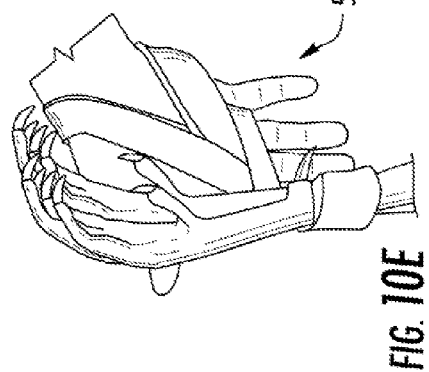
Figure 10A:
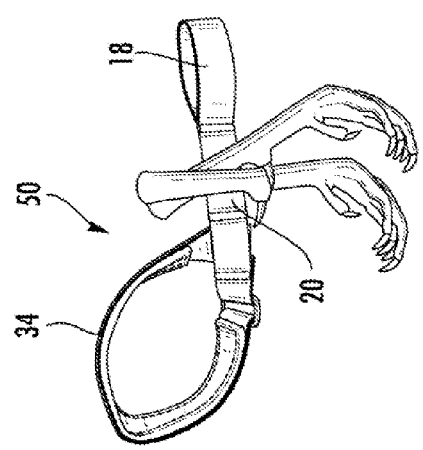
Figure 10D:
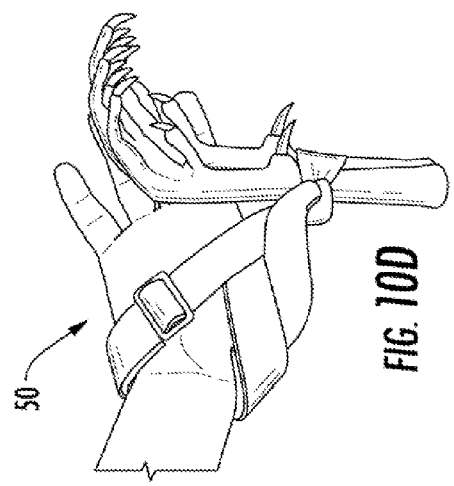

An embodiment of the completed assembly shown in FIGS. 7 and 8 has two loops in the strip of material 5: a smaller loop 18 at the proximal end which will be the proximal end folded on itself, and a larger loop 34 at the opposite end which comprises the neoprene padding. The first loop has a first diameter and the second loop has a second, adjustable diameter, and in embodiments the second diameter may be 2 to 20 times greater than the first diameter or any range in between, such as 4 to 16 times, 5 to 15 times, 6 to 14 times, 7 to 13 times, 8 to 12 times, 8 to 10 times, 10 to 12 times, or 9 to 11 times the length of the first diameter. The assembled turkey carrier also has an intermediate or transition area 20 (a section of the strip of material) between the two loops. The transition area may be as long as the length of the smaller loop. Further, it can be seen from FIGS. 7 and 8 that the two loops 18, 34 are orthogonal to each other such that a plane bisecting the smaller loop is at a right angle to a plane bisecting the larger loop. Further, the buckle 26 of the larger loop provides an adjustable diameter and the neoprene padding 28 provides comfort when worn on the wrist. As shown in FIG. 10A, the completed turkey carrier 50 may be used such that the intermediate area 20 of the carrier may be positioned under the turkey's legs with the two loops 18, 34 on opposite sides. The intermediate area 20 is usually positioned above the spurs of a male turkey, as shown in FIG. 10A. As shown in FIG. 10B, the larger loop is inserted into the smaller loop and pulled tight to secure the turkey's legs, while simultaneously leaving the larger loop with padded strap and adjustable diameter for the user to wear as a wrist strap as shown in FIGS. 10C and 10D. Such a configuration distributes the load of the animal through the entire arm—no grip strength is needed. FIGS. 10E and 10F show that the turkey may be carried over the shoulder using the assembled turkey carrier. The turkey carrier may be assembled in a variety of sizes depending on the length of the strip of material.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A turkey carrier, comprising:
a single strip of material configured to provide:
a first loop of a first diameter;
a second loop of a second, adjustable diameter; and
an intermediate area between the first loop and the second loop; wherein the second diameter is greater than the first diameter, and the second loop is configured to function as a wrist strap;
wherein an end of the second loop passes through the single strip of material at two parallel loops with a pair of sets of stiches as boundaries.

2. The turkey carrier of claim 1, further comprising:
a buckle attached to the strip of material at the second loop, wherein the buckle provides for adjustment of diameter of the second loop.

3. The turkey carrier of claim 1, further comprising:
a strip of padding attached to the single strip of material at the second loop, wherein the strip of padding is the same width as a portion of a length of the single strip of material and overlays the single strip of material.

4. The turkey carrier of claim 1, wherein the second loop is twisted orthogonally relative to the first loop.

5. The turkey carrier of claim 1, wherein the first loop comprises a set of stiches within the single strip of material.

6. The turkey carrier of claim 1, wherein the second diameter is 2 to 20 times the first diameter.

* * * * *